US011284062B2

(12) United States Patent
Dubey et al.

(10) Patent No.: US 11,284,062 B2
(45) Date of Patent: Mar. 22, 2022

(54) AUTOMOTIVE DISPLAY VALIDATION (71) Applicant: TEXAS INSTRUMENTS INCORPORATED, Dallas, TX (US)

(72) Inventors: Aishwarya Dubey, Plano, TX (US); Peter Labaziewicz, Allen, TX (US); Alan Rankin, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 206 days.

(21) Appl. No.: 16/017,324

(22) Filed: Jun. 25, 2018

(65) Prior Publication Data

US 2019/0075290 A1 Mar. 7, 2019

Related U.S. Application Data

(60) Provisional application No. 62/554,105, filed on Sep. 5, 2017.

(51) Int. Cl.
*H04N 17/00* (2006.01)
*H04N 5/232* (2006.01)
*B60R 1/00* (2006.01)
*H04N 7/18* (2006.01)

(52) U.S. Cl.
CPC ............. *H04N 17/004* (2013.01); *B60R 1/00* (2013.01); *H04N 7/183* (2013.01); *H04N 17/002* (2013.01); *B60R 2300/306* (2013.01); *H04N 5/23293* (2013.01)

(58) Field of Classification Search
CPC .......................... B60R 2300/306; H04N 7/183
See application file for complete search history.

(56) References Cited

U.S. PATENT DOCUMENTS

| 5,019,899 A | * | 5/1991 | Boles ................. G06K 9/00711 |
| | | | 348/184 |
| 6,075,513 A | * | 6/2000 | Reddy .................. G09G 3/3611 |
| | | | 345/204 |
| 2003/0103141 A1 | | 6/2003 | Bechtel et al. |
| 2009/0164213 A1 | * | 6/2009 | Lennington ........ G06K 9/00711 |
| | | | 704/231 |
| 2009/0245573 A1 | * | 10/2009 | Saptharishi .............. G06K 9/52 |
| | | | 382/103 |

(Continued)

OTHER PUBLICATIONS

Wikipedia, Cyclic Redundancy Check, Jun. 4, 2018, https://en.wikipedia.org/wiki/Cyclic_redundancy_check.

(Continued)

*Primary Examiner* — Mainul Hasan
(74) *Attorney, Agent, or Firm* — Charles F. Koch; Charles A. Brill; Frank D. Cimino (57) ABSTRACT

A method includes receiving, by a system-on-a-chip (SoC) from a camera mounted on a vehicle, a first image and transmitting, by the SoC to a display circuit over an interface cable, the first image. The method also includes receiving, by the SoC from the display circuit, a feedback signature corresponding to the first image. Additionally, the method includes detecting, by the SoC, an error, in response to determining that the feedback signature does not match the transmission-side signature and transmitting, by the SoC to the display circuit, a second image, in response to determining that the feedback signature matches the transmission-side signature.

19 Claims, 9 Drawing Sheets

(56) References Cited

U.S. PATENT DOCUMENTS

| | | | |
|---|---|---|---|
| 2011/0261257 A1* | 10/2011 | Terry | G06K 9/00221 |
| | | | 348/515 |
| 2012/0069184 A1* | 3/2012 | Hottmann | B60R 1/00 |
| | | | 348/148 |
| 2015/0104073 A1* | 4/2015 | Rodriguez-Serrano | |
| | | | G06K 9/00791 |
| | | | 382/105 |
| 2015/0222880 A1 | 8/2015 | Choi et al. | |
| 2015/0251602 A1* | 9/2015 | Baur | G08G 1/167 |
| | | | 348/148 |
| 2015/0302737 A1 | 10/2015 | Geerlings et al. | |
| 2016/0117557 A1* | 4/2016 | Bettagere | G06T 7/001 |
| | | | 382/100 |
| 2016/0210861 A1* | 7/2016 | Bergsagel | B60R 1/00 |
| 2016/0267179 A1* | 9/2016 | Mei | G06F 16/7834 |
| 2016/0378427 A1 | 12/2016 | Sharma et al. | |
| 2018/0005078 A1* | 1/2018 | Lim | G06K 9/4604 |
| 2018/0157939 A1* | 6/2018 | Butt | H04N 21/466 |
| 2018/0165814 A1* | 6/2018 | Gulati | G06T 7/001 |

OTHER PUBLICATIONS

International Search Report and Written Opinion for PCT/US2018/049506 dated Jan. 10, 2019.

* cited by examiner

AUTOMOTIVE DISPLAY VALIDATION

CROSS-REFERENCE TO RELATED APPLICATION

This application claims the benefit of U.S. Provisional Patent Application No. 62/554,105, filed on Sep. 5, 2017, entitled "A Method and System to Detect End-to-End Frame Freeze and bad Pixel Data for a Safety Critical Automotive Display and Processor System," which application is hereby incorporated herein.

TECHNICAL FIELD

The present disclosure relates to a system and method for automotive display, and in particular, to a system and method for automotive display validation.

BACKGROUND

Many applications involve safety critical displays. For example, the tell tales of digital clusters are safety critical. Also, driven by advanced safety features and driver assistance applications, the automotive industry is increasing the amount of information shared with automobile drivers. Examples of driver assistance applications include rear camera applications, surround view camera applications, and side and rear view mirror replacement applications. Driver assistance applications involve displaying safety critical video footage captured by a camera and other information to a display, to be viewed by a driver of the automobile. The display may include additional information added to the video, for example parking lines in a parking application.

SUMMARY

An example method includes receiving, by a system-on-a-chip (SoC) from a camera mounted on a vehicle, a first image and transmitting, by the SoC to a display circuit over an interface cable, the first image. The method also includes receiving, by the SoC from the display circuit, a feedback signature corresponding to the first image. Additionally, the method includes detecting, by the SoC, an error, in response to determining that the feedback signature does not match the transmission-side signature and transmitting, by the SoC to the display circuit, a second image, in response to determining that the feedback signature matches the transmission-side signature.

An example automotive display system includes a display circuit. The display circuit includes an interface configured to receive an image from an SoC over an interface cable and a frame random access memory (RAM) coupled to the interface, the frame RAM configured to store the image. The display circuit also includes light emitting diode (LED) drivers coupled to the frame RAM, the LED drivers configured to display the image on a display and a signature generator coupled to the frame RAM. The signature generator is configured to generate a feedback signature based on the image and transmit, to the SoC, the feedback signature.

An example circuit includes a histogram generation circuit. The histogram generation circuit includes a first configuration register bin thresholds for B bins, where B is an integer greater than 1 and a second configuration register indicating a portion of an image. The histogram generation circuit also includes an M-way comparator coupled to the first configuration register and to the second configuration register, the M-way comparator configured to generate M histograms of the portion of the image, the M histograms containing N bins, where M is an integer greater than 1, and a histogram merging circuit configured to generate an output histogram based on the M histograms, the output histogram containing N bins.

BRIEF DESCRIPTION OF DRAWINGS

For a more complete understanding of the present disclosure, and the advantages thereof, reference is now made to the following descriptions taken in conjunction with the accompanying drawings, in which.

DETAILED DESCRIPTION

Displaying information to drivers in automotive applications assists the driver in making decisions based on high quality information. However, such a display imposes strict safety requirements on the displayed content. The safety requirements ensure the safety goals of the correct safety critical data being displayed, the frame not being partially or fully frozen, and the image frame meeting the safety critical latency requirements. It is desirable for an automotive display system to guarantee accuracy, for example using automotive display validation.

Figure 1:
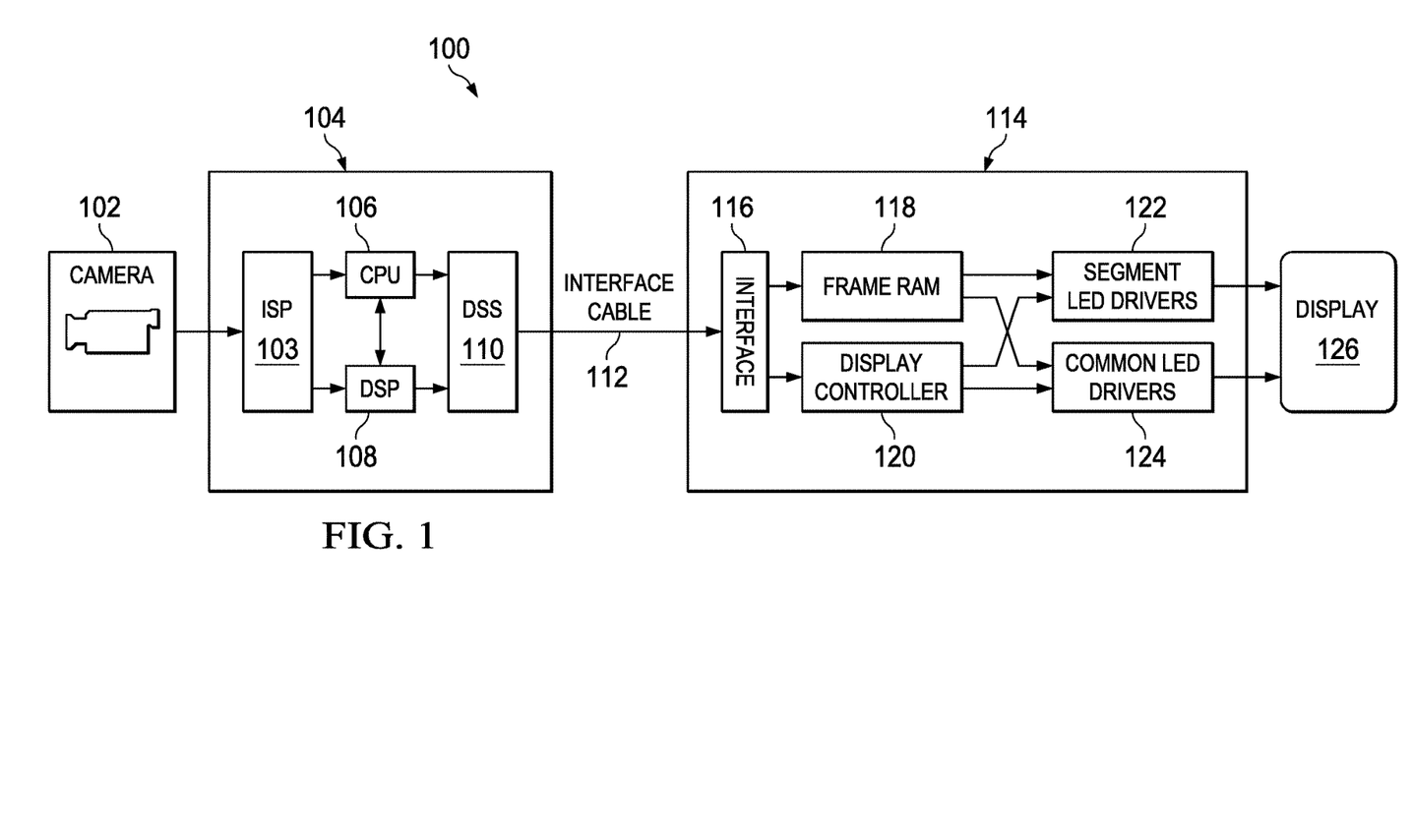
FIG. 1 illustrates an example automotive display system.

FIG. 1 illustrates automotive display system 100, which a camera 102, system-on-a-chip (SoC) 104, display circuit 114, and display 126. In an example, the camera 102 is mounted on a vehicle, such as an automobile or truck. The camera 102 may be a charge coupled device (CCD) video camera or a complementary metal oxide semiconductor (CMOS) video camera, and may face in any direction. In one embodiment, a vehicle contains multiple cameras facing in multiple directions.

The SoC 104 receives video data from the camera 102. In an embodiment, the SoC 104 is a TDAx™ driver assistance chip, produced by Texas Instruments. The SoC 104, which may be located close to the camera 102, contains processors, such as an image signal processor (ISP) 103, a central processing unit (CPU) 106, and a digital signal processor (DSP) 108. Three processors are pictured, but the SoC 104 may include multiple CPUs, multiple DSPs, or other processors, such as one or more embedded vision engine (EVE) processors. The ISP 103 processes the raw data received from the camera 102. The CPU 106 and the DSP 108 perform processing on the video data received from the camera 102. The SoC 104 also includes a display subsystem (DSS) 110, which outputs the video data processed by the CPU 106 and the DSP 108 to the display circuit 114. In an embodiment, the video output data of the DSS is validated during processing.

The SoC 104 is coupled to the display circuit 114 by an interface cable 112. The interface cable 112 may be an Ethernet cable, a low voltage differential signaling (LVDS) cable, a high definition multimedia interface (HDMI) cable, or another cable type. The interface cable 112 may be many meters long. For example, one end of the interface cable 112 may be in the rear of a truck, and the other end inside the cab of the truck.

The display circuit 114 includes an interface 116, a frame random access memory (RAM) 118, a display controller 120, segment light emitting diode (LED) drivers 122, and a common LED drivers 124. In one embodiment, the display circuit 114 is a printed circuit board (PCB). The interface 116 receives a video signal transmitted from the SoC 104 over the interface cable 112. The frame RAM 118 stores the video frames for display to a user, such as a driver. Also, the display controller 120 controls the display by signaling the segment LED drivers 122 and the common LED drivers 124. The segment LED drivers 122 and the common LED drivers 124 display the video stream to the user via the display 126, which may be an LED display. It is desirable to validate the display at locations in the transmission path that occur after all or part of the interface cable 112, at the display circuit 114, or at the display 126.

An example automotive display validation system detects errors in an automotive display, such as frozen frames and bad pixel data, for safety critical automotive applications. Some embodiments utilize exact methods of automotive display validation that validate the entire display. Other embodiments utilize approximate statistical methods of automotive display validation that consider a portion of the display. In an embodiment, a hardware circuit is used to generate histograms on-the-fly.

Figure 2:
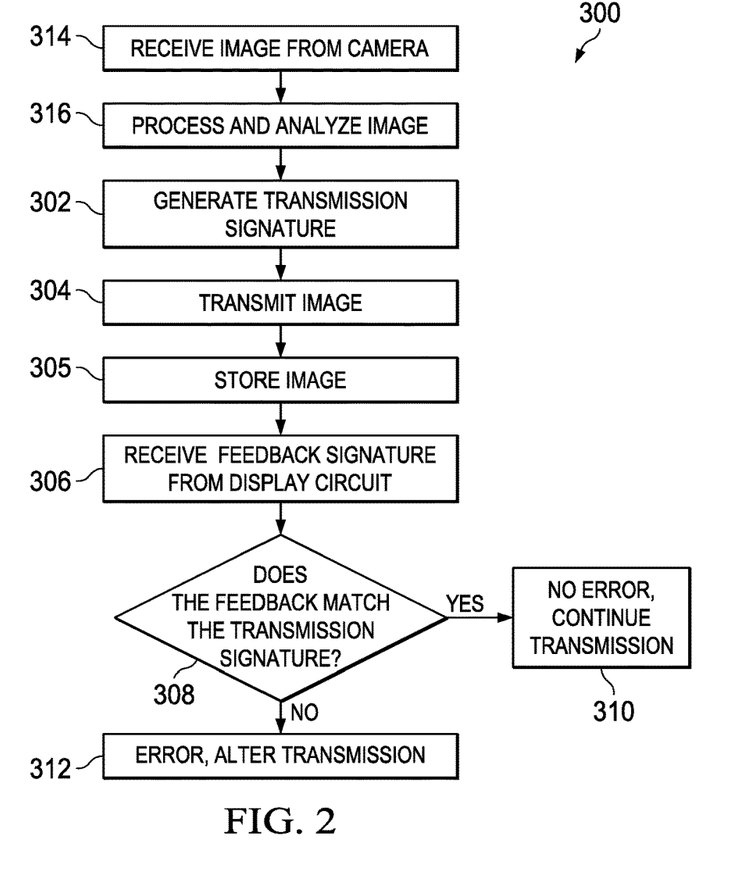
FIG. 2 illustrates a flowchart of an example method of automotive display validation performed by a system-on-a-chip (SoC)

FIG. 2 illustrates a flowchart 300 for an example method of automotive display validation performed by a transmission-side SoC. In block 314, the SoC receives a video image from a camera. The camera may be mounted, pointing in any direction, on a vehicle, such as an automobile. In an embodiment, the SoC is located physically close to the camera.

In block 316, the SoC performs processing and analysis on the video image, to generate a processed image. A processor, such as an ISP, performs image processing on the video image received from the camera in the block 314. For example, the processor performs Bayer transformation, demosiacing, noise reduction, and/or image sharpening. In Bayer transformation, the processor determines an RGB value for each pixel based on a pattern designated by the Bayer filter. In demosiacing, the processor evaluates the color and brightness data of a pixel, compares the color and brightness data with the color and brightness data from neighboring pixels, and uses a demosiacing algorithm to generate an appropriate color and brightness value for the pixel. The processor may also access the picture as a whole to ensure the correct distribution and contrast, for example by adjusting the gamma value. In noise reduction, the processor separates noise from the image to remove noise, for example by filtering the image. In image sharpening, edges and contours are sharpened using edge detection. Image sharpening may be performed to compensate image softening that was introduced by the noise reduction. In some embodiments, the block 316 is not performed.

In block 302, the SoC generates a transmission-side signature for the image received in the block 314. The block 302 may be performed by a processor of the SoC, such as a DSP or a CPU. In some embodiments, the transmission-side signature is a timestamp, a histogram, a cyclic redundancy check (CRC) value, a frame difference signature, or a secure hash algorithm (SHA) value. In a frame difference signature, the signature is the difference in value between two consecutive frames. For example, the processor may determine the absolute value of the difference between the pixel values of two consecutive frames, and sum these absolute value differences to determine the frame difference signature. In another example, the processor determines the signed value of the difference between the pixel values of two consecutive frames, and sums these signed difference values, to generate the frame difference signature. The processor may generate the transmission-side signature based on the video image received in the block 314 or based on the processed image generated in the block 316. In some embodiments, the processor may generate the transmission-side signature based on an entire image or based on a portion of the image. In additional embodiments, the processor generates the transmission-side signature by altering the image. In one embodiment, the processor adds a reference frame, such as an all-black frame or an all-white frame, to the video transmission stream. In other embodiments, the processor alters a portion of the frame in a predetermined manner. For example, a patch of white or black pixels may be added to a portion of the image not viewed by the user. In other embodiments, the processor adds an infrared pattern not visible to the user to the image. In additional embodiments, the processor selects a pseudo-random block from the image, and modifies the pseudo-random block. The processor may vary the location of the pseudo-random pattern used for selecting pseudo-random blocks from frame to frame to statistically cover the correctness of the whole display region. In some examples, the processor resizes the image before generating the transmission-side signature. In some embodiments, the block 302 is not performed. In other embodiments, the processor performs the block 302 after transmitting the image, or after storing the image.

In block 304, the SoC transmits a transmitted image to a display circuit. The transmitted image may be the video image received in the block 314 or the processed image generated in the block 316. The transmitted image may be transmitted by a DSS of the SoC, over an interface cable, to an interface of the display circuit. In some examples, the interface cable, which may be many meters long, is an Ethernet cable, LVDS cable, or HDMI cable. In some embodiments, the transmission-side signature is not transmitted. In other embodiments, the SoC separately transmits the transmission-side signature transmitted, or the SoC transmits the transmission-side signature together with the image.

In block 305, the SoC stores a copy of the transmitted image in memory, such as in RAM. Additionally, or alternatively, the SoC stores the transmission-side signature generated by the block 302 in the memory.

In block 306, the SoC receives a feedback signature, corresponding to the image transmitted in the block 304, from the display circuit. The feedback signature indicates characteristics of the image which the display circuit receives, processes, or displays. In one embodiment, the SoC receives the feedback signature over the same interface cable used to transmit the transmission image to the display circuit. In another embodiment, a separate interface cable is used for receiving the feedback signature. In an embodiment, the feedback signature is a CRC value, a frame comparison signature, or an SHA value. In some embodiments, the feedback signature is a timestamp. In other embodiments, the feedback signature is an image. This image, which may be smaller than the transmitted image, may be obtained by a camera which is monitoring the display. In other embodiments, a demultiplexer, which obtains the image, extracts all or part of the image before the image is sent to the display controller. In some embodiments, the transmitted image and/or the feedback image are resized to have the same scale. In some embodiments, the feedback signature is a signal detected by a light sensor over a portion of the image.

In block 308, the SoC determines whether the feedback signature matches the transmission-side signature. In one embodiment, the feedback signature matches the transmission-side signature when the feedback signature is the same as the transmission-side signature. In another embodiment, the feedback signature matches the transmission-side signature when the difference, or the sum of absolute difference, between the feedback signature and the transmission-side signature is less than a threshold value. In some embodiments, where the feedback signature is a feedback image, the SoC determines whether the feedback image matches the transmitted image. When the feedback signature matches the transmission-side signature, the SoC proceeds to block 310, and determines that there is no error. On the other hand, when the feedback signature does not match the transmitted image, there is an error, and the SoC proceeds to block 312. In one embodiment, to determine whether the feedback signature matches the transmission-side signature, the SoC compares the feedback signature to the transmission-side signature for the transmitted or stored image. The SoC determines that the transmission-side signature and the feedback signature match when they are similar, but not identical, for example when the difference between the transmission-side signature and the feedback signature is less than a predefined threshold. In another embodiment, the SoC only determines that the transmission-side signature and the feedback signature match when they are identical. In an embodiment, to determine whether the feedback signature matches the transmission-side feedback, the SoC performs an analysis on the transmitted image and on a feedback image, and compares the results. In one embodiment, the feedback signature is a feedback image, and the SoC generates corner features for the transmitted image and for the feedback image, and compares the corner features, to determine whether the feedback signature matches the transmitted image. One or both of the images may be scaled before generating the corner features, so the images have the same scale. In another embodiment, the SoC generates histograms for the transmitted image and on the feedback image, and compares the histograms, to determine whether the feedback signature matches the transmitted image. One or more histogram generation circuits may be used to generate the histograms, and a histogram comparison circuit may be used to compare the histograms. In another example, software generates and compares the histograms. In one embodiment, the SoC compares a value from a light sensor to an expected value based on a predetermined pattern, to determine whether the feedback signature matches the transmitted image.

In block 310, the SoC determines that there is no error, and continues to transmit images to the display circuit. For example, the SoC transmits another image to the display circuit.

In block 312, the SoC determines that there is an error, and alters transmission. In an embodiment, the SoC ceases to transmit images to the display controller. Additionally, or alternatively, the SoC may transmit an error message to the user, indicating the nature of the error. The error message may indicate whether the error is a frozen frame or pixel errors. In one embodiment, when the SoC detects an error, a second display, for example a lower resolution display using a secondary image screen, is used, instead of the primary image screen.

Figure 3:
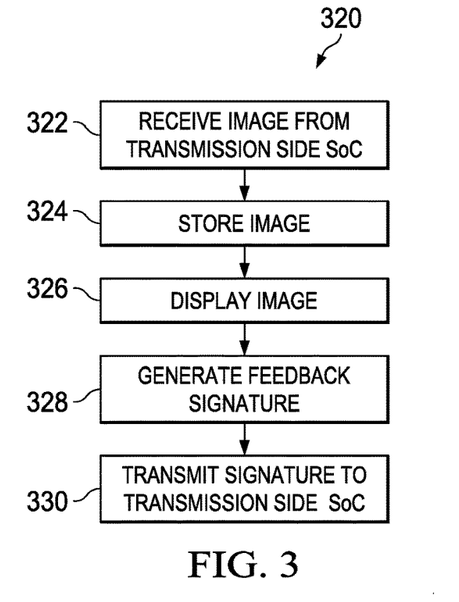
FIG. 3 illustrates a flowchart for an example method of automotive display validation performed by a display circuit.

FIG. 3 illustrates a flowchart 320 for an example method of automotive display validation, performed by a display circuit. In block 322, an interface of the display circuit receives an image from a transmission-side SoC, for example over an interface cable.

In block 324, the display circuit stores the image received in the block 322 in frame RAM.

In block 326, the display circuit displays the image stored in the frame RAM on a display visible to a user, for example a user who may be driving a vehicle. A display controller may control segment LED drivers and common LED drivers to display the image on the display. The display may be an LED display located near the user.

In block 328, the display circuit generates a feedback signature based on the image. In one embodiment, the display circuit generates the feedback signature by extracting the image from the frame RAM and generating the feedback signature based on the extracted image. The feedback signature may be a CRC value, a histogram, a timestamp embedded in the image, a frame comparison between consecutive frames, or another signature, such as an SHA value. In an embodiment, the display circuit generates a timestamp as the feedback signature. In another embodiment, a video camera obtains the feedback signature and views the display. In an additional embodiment, a light sensor located in a particular region of the display generates the feedback signature. In another example, a demultiplexer generates the feedback signature, for example an LVDS demultiplexer in the interface cable near the display circuit.

In block 330, the display circuit transmits the feedback signature to the SoC. In one embodiment, the feedback signature is transmitted on the same interface cable used to receive the image in the block 322. In another example, a separate interface cable is used.

Figure 4:
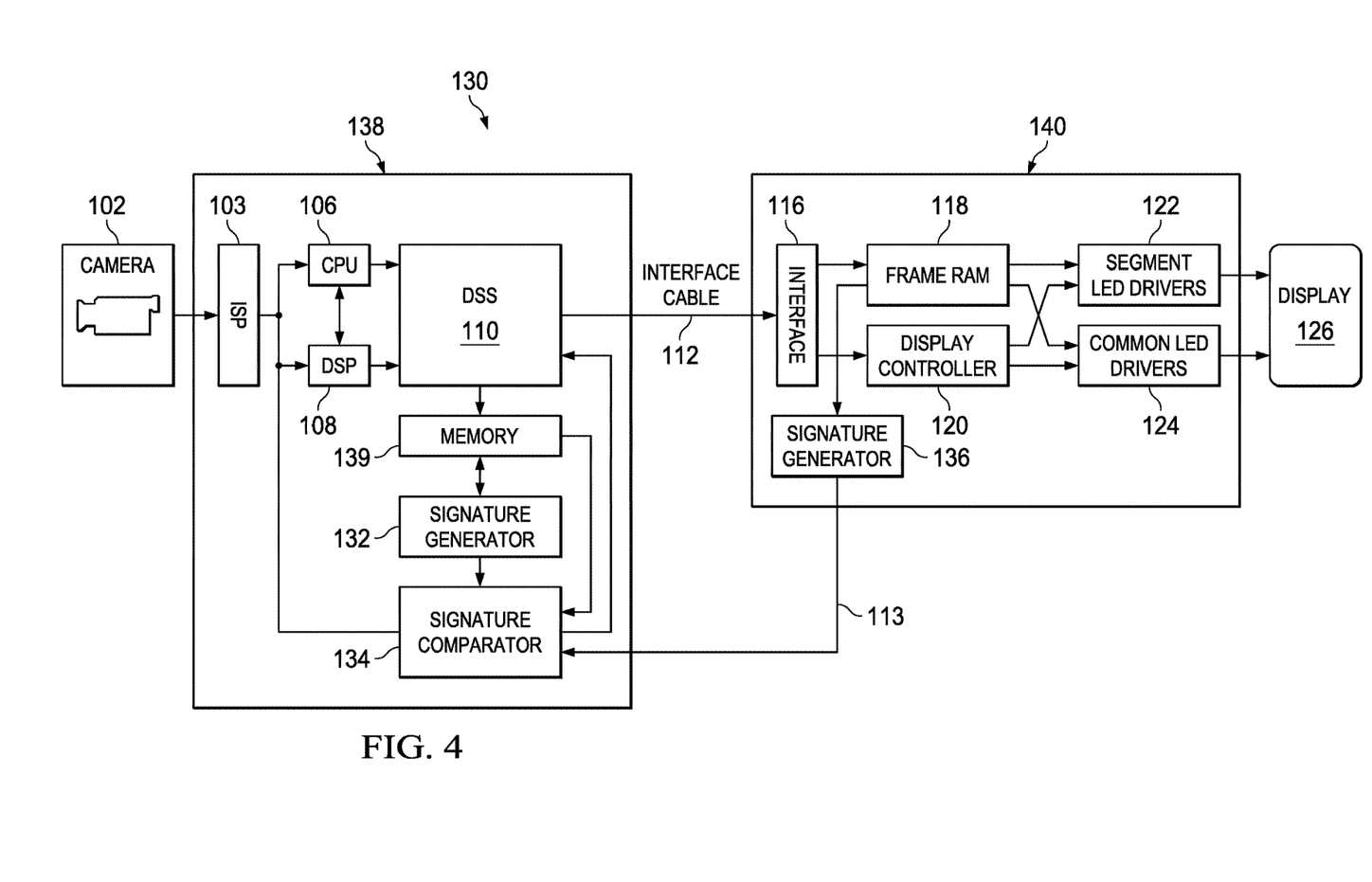
FIG. 4 illustrates an example automotive display validation system.

FIG. 4 illustrates an automotive display validation system 130, which implements a method of automotive display validation based on the entire image. In some embodiments, the automotive display validation system 130 uses a low bandwidth feedback signature. The automotive display validation system 130 includes video feedback 113 from within display circuit 140 to SoC 138. The SoC 138 receives an image, captured via the camera 102 and the ISP 103. The CPU 106 and the DSP 108 process the received image. In one embodiment, the camera 102 is mounted on a vehicle, such as an automobile. The SoC 138 transmits the image, using DSS 110, to the display circuit 140, over interface cable 112. In one embodiment, a clock on the SoC 138 generates a timestamp, which is associated with the image. In one embodiment, the timestamp indicates the time that the SoC 138 transmits the image. In another embodiment, the timestamp indicates the time that the SoC 138 receives the image. The SoC 138 may also store a copy of the transmitted image in memory 139, which may be a RAM. The ISP 103 performs image processing on the raw image received from the camera 102. For example, the ISP 103 performs Bayer transformation, demosiacing, noise reduction, or image sharpening. In Bayer transformation, the ISP 103 determines an RGB value for each pixel based on a pattern designated by the Bayer filter. In demosiacing, the ISP 103 evaluates the color and brightness data of a pixel, compares the color and brightness data with the color and brightness data from neighboring pixels, and uses a demosiacing algorithm to produce an appropriate color and brightness value for the pixel. The ISP 103 may also access the picture as a whole to ensure the correct distribution and contrast, for example by adjusting the gamma value. In noise reduction, the ISP 103 separates noise from the image to remove noise, for example by filtering the image. In image sharpening, the ISP 103 sharpens edges and contours using edge detection. Image sharpening may be performed to compensate image softening that was introduced by the noise reduction.

The display circuit 140 receives the image at the interface 116, from the SoC 138 over the interface cable 112. In one embodiment, the display circuit 140 adds a timestamp to the image at the time of arrival, using a clock on the display circuit 140. The frame RAM 118 stores the image, which also proceeds to display controller 120. The image from the frame RAM 118 is shown by the display 126 using segment LED drivers 122 and common LED drivers 124.

Signature generator 136 extracts the image from the frame RAM 118, and generates a feedback signature. The feedback signature may be a CRC value, a comparison between frames, or another mechanism, such as an SHA value. In one embodiment, the signature generator 136 extracts a timestamp from the image. In another embodiment, the signature generator 136 generates a timestamp. In one embodiment, the signature generator 136 generates a histogram of the image. In an embodiment, the signature generator 136 is implemented by a processor, for example a CPU. The display circuit 140 then transmits the feedback signature 113 to the SoC 138. In one embodiment, the interface cable 112 transmits the feedback signature. In another example, a separate cable, for example a low throughput cable, transmits the feedback signature.

The SoC 138 reads the stored image from the memory 139. Also, in some embodiments, the signature generator 132 generates a transmission-side signature for the stored image. In an embodiment, the signature generator 132 uses the same signature generation mechanism as the signature generator 136. In some embodiments, the memory 139 stores the transmission-side signature.

Signature comparator 134 compares the transmission-side signature generated by the signature generator 132 of the transmitted image with the feedback signature generated by the signature generator 136. In an embodiment, the signature comparator 134 compares the CRC value in the transmission-side signature to the CRC value in the feedback signature, and a match is detected when the CRC values are the same. In an embodiment, the signature comparator 134 compares the timestamp of the transmission-side signature to the timestamp of the feedback signature. The time lag for the image transmission and the asynchronous nature of the clock for the SoC 138 and the clock for the display circuit 140 may be taken into account in comparing the timestamps. For example, the signature comparator 134 subtracts a predetermined transmission time value from the feedback timestamp, to generate a compensated timestamp. Then, the signature comparator 134 determines the difference between the compensated timestamp and the transmission-side timestamp. In an embodiment, the signature comparator 134 determines that the compensated timestamp matches the transmission-side timestamp when they are within a predetermined threshold of each other, to account for variations in transmission time. In one embodiment, the transmission-side signature and the feedback signature must match exactly to determine a match. In another embodiment, the signature comparator 134 determines that the transmission-side signature and the feedback signature match when they are similar, and that they do not match when they are not similar, to account for noise. Relatively small amounts of noise in the image do not pose a safety threat. However, the signature comparator 134 detects significant mismatches, for example lost frames, which pose a safety threat. The signature comparator 134 may send the results to the DSS 110 to control further image transmission.

For example, the DSS 110 may halt image transmission when it detects an error, and continues image transmission when it determines that there is no error. In one embodiment, additionally or alternatively, the DSS 110 transmits an error message to the display circuit 114, indicating the nature or magnitude of the error. In one embodiment, the signature generator 132 and the signature comparator 134 are implemented on a separate processor. In other embodiments, the signature generator 132 and the stamp and signature comparator 134 are implemented on the DSP 108 or on the CPU 106. In another embodiment, the DSS 110 transmits an error frame to the display and transmits tell-tales over a bus, such as a controller area network (CAN) bus, a multichannel audio serial port (McASP), a serial peripheral interface (SPI) bus, or the interface cable 112. The tell-tales may be auditory or visual messages perceptible to the user. For example, a warning light or alarm signal may alert the user to a display error.

Figure 5:
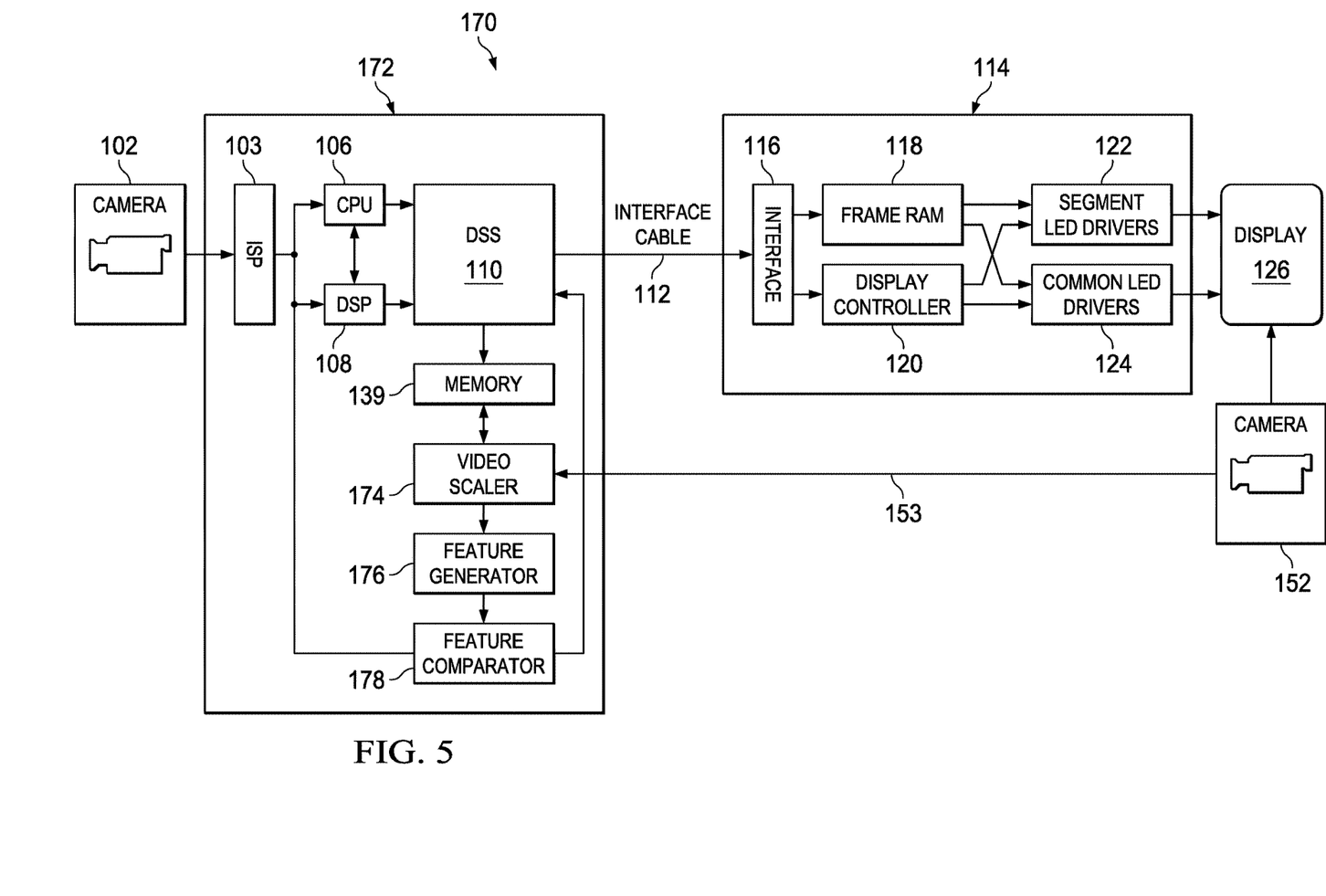
FIG. 5 illustrates another example automotive display validation system.

FIG. 5 illustrates an automotive display validation system 170, which is a method of automotive display validation based on considering the entire image. The automotive display validation system 170 includes video feedback 153 to SoC 172 from camera 152 trained on a display 126. In an embodiment, the automotive display validation system 170 is nonintrusive, and does not require modifications of the display circuit 114. Additionally, the automotive display validation system 170 monitors the images actually being displayed on the display 126. An advantage of the automotive display validation system 170 is that the display circuit 114 and the display 126 may be similar to display circuits and displays that do not have display validation.

The SoC 172 receives an image from the camera 102, which is mounted on a vehicle, such as an automobile. Processors of the SoC 172, such as the ISP 103, the CPU 106, and the DSP 108, process the image. The DSS 110 transmits the processed image to the display circuit 114 over the interface cable 112. Also, the memory 139, for example RAM, stores the transmitted image. The interface cable 112 may be an Ethernet cable, an LVDS cable, or an HDMI cable.

In the display circuit 114, the interface 116 receives the image transmitted from the SoC 104 over the interface cable 112. The display controller 120 controls the display 126 by signaling the segment LED drivers 122 and the common LED drivers 124. Also, the frame RAM 118 stores the video frames for display. The segment LED drivers 122 and the common LED drivers 124 display the video to a user via the display 126, which may be an LED display. The camera 152 monitors the displayed image. The camera 152 may be a CCD video camera or a CMOS video camera. In one embodiment, the camera 152 has a lower resolution than the camera 102. The camera 152 feeds back the acquired images to the SoC 172 as image feedback 153. In one embodiment, the image feedback is transmitted over the interface cable 112. In another example, the image feedback is transmitted over a separate cable.

The SoC 172 receives the images from the camera 152. In the SoC 172, video scaler 174 retrieves the image stored in the memory 139 and scales the stored image and/or the received image, so the two images have the same scale. In some embodiments, the video scaler 174 scales the transmitted image to generate a scaled image, and the memory 139 stores the scaled image. In some embodiments, for example in some embodiments that use histograms, the video scaler 174 is not used.

A feature generator 176 generates features for both the received image and the stored image. In one embodiment, the feature generator 176 and the feature comparator 178 are implemented by a processor, such as the CPU 106, the DSP 108, or another processor. In another embodiment, for example when histograms are used, the feature generator 176 and feature comparator 178 are implemented in dedicated hardware, for example a histogram generation circuit and a histogram comparison circuit. In one embodiment, the feature generator 176 generates corner features, or points of interest, for the received image and for the transmitted image. A corner may be defined as the intersection of two edges or a point for which there are two dominant and different edge directions in a local neighborhood of the point. Corner detection may be performed using correlation, Moravec corner detection, Harris Stephens corner detection, Forstner corner detection, the multi-scale Harris operator, or another approach, such as the level curve curvature approach, Laplacian of Gaussian approach, scale-space interest points, Wang and Brady corner detection, the smallest univalue segment assimilating nucleus (SUSAN) corner detection, the Trajkovic and Hedley detection, the accelerated segment test (AST) based feature detection, or with the automatic synthesis of detectors.

In another embodiment, the feature generator 176 generates histograms for the received image and for the transmitted image. The histogram may be an intensity histogram for the image or color histograms. The feature generator 176 divides the value ranges into bins, and places each pixel in the corresponding bin. The bins may be uniform in size, or they may vary in size.

The feature comparator 178 compares the features generated in the feature generator 176 for the transmitted frame to the feedback image. When corner features are used, the feature comparator 178 compares the corner features of the transmitted frame to the corner features of the feedback image. Likewise, when histograms are used, the feature comparator 178 compares the histogram of the transmitted frame to the histogram of the feedback image. The feature comparator 178 may normalize the histograms so they have the same scale. Each frame may have a unique histogram, so matching histograms indicates matching frames. In some embodiments, the corner features or histograms must match exactly to determine a match. In another example, sufficiently similar corner features or histograms indicate a match. For example, the feature comparator 178 may determine that histograms match when the sum of absolute difference between the normalized histograms is less than a predetermined value. In another example, the feature comparator 178 determines that corner features match when difference in magnitude and/or location of the corner features is within a predetermined threshold. The feature comparator 178 sends the comparison results to the DSS 110. The feature comparator 178 also sends the comparison results to the DSP 108 and the CPU 106. The DSP 108 and the CPU 106 assist in detecting scenario errors, and improve robustness.

The DSS 110 may halt image transmission when it detects an error, and continue image transmission when it determines that there is no error. Additionally or alternatively, the DSS 110 transmits an error message to the display circuit 114, indicating the nature or magnitude of the mismatch.

Figure 6:
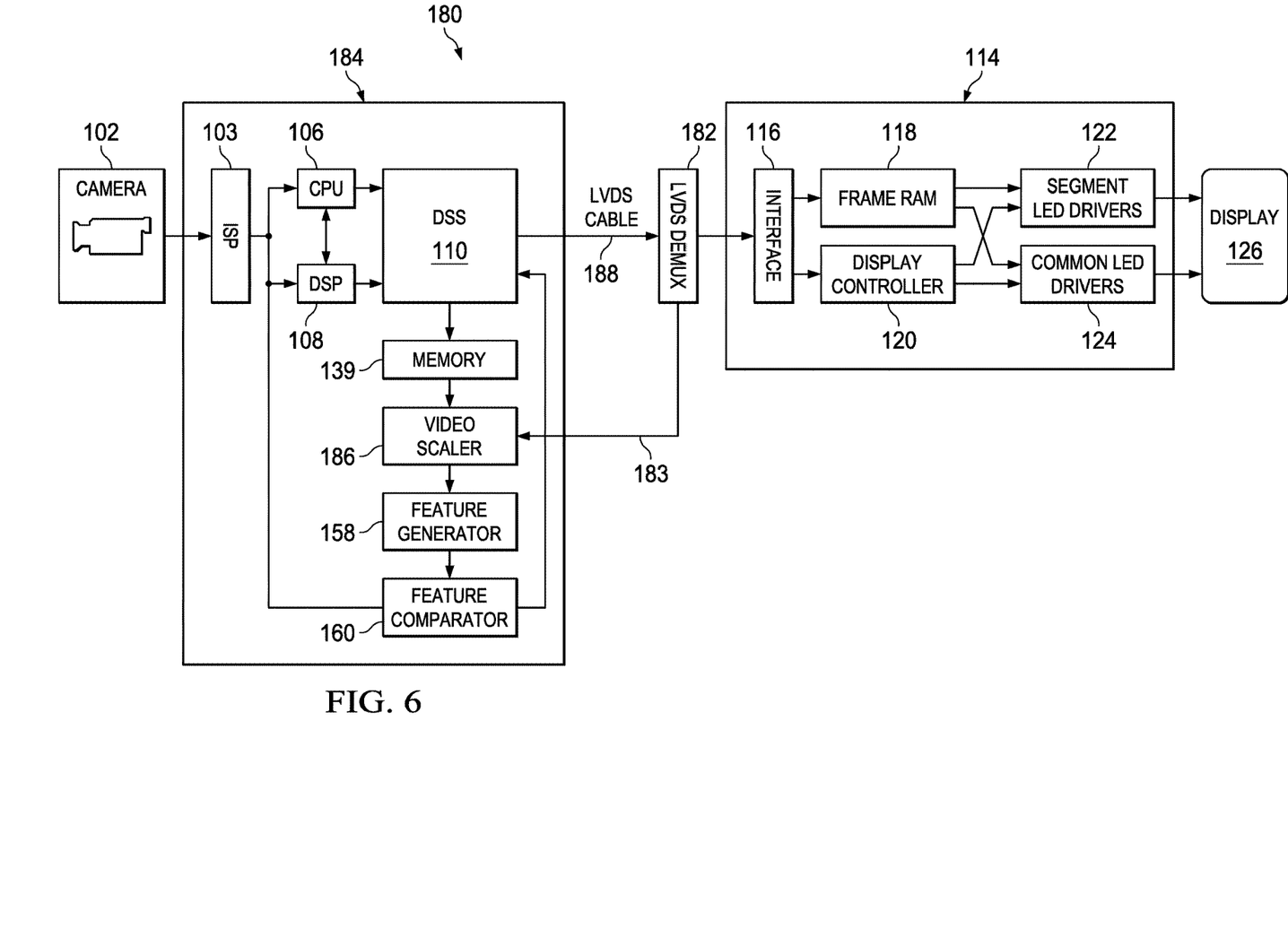
FIG. 6 illustrates an additional example automotive display validation system.

FIG. 6 illustrates automotive display system 180, which uses an LVDS demultiplexer (demux) 182 to extract a portion of the transmitted image from an LVDS cable 188. The automotive display system 180 is a method of automotive display validation based on the entire image. Advantages of the automotive display system 180 include a low cost. Another advantage of the automotive display system 180 is that the display circuit 114 and the display 126 may be similar to display circuits and displays that do not have display validation.

The camera 102, which is mounted on a vehicle, transmits an image to SoC 184. The SoC 184 includes processors, such as the ISP 103, the CPU 106, and the DSP 108, that process the image and store the image in the memory 139. The DSS 110 transmits the image to the display circuit 114 over the LVDS cable 188. The SoC 184 may also store the transmitted image in the memory 139.

The LVDS demultiplexer 182 extracts an image frame from the LVDS cable 188. In one example, the LVDS demultiplexer 182 may sample the image data during the extraction process. The LVDS demultiplexer 182 sends the extracted frame back to the SoC 184 as a feedback signature 183. In one embodiment, the feedback signature is transmitted over the LVDS cable 188. In another example, the feedback signature is transmitted over a separate cable. In one embodiment, as pictured, the LVDS demultiplexer 182 is before the display circuit 114. In another embodiment, the LVDS demultiplexer 182 is at the input of the display circuit 114.

The interface 116 of the display circuit 114 receives the video signal transmitted from the SoC 184 over the LVDS cable 188. The frame RAM 118 stores the video frames for display to the user. Additionally, the display controller 120 controls the display by signaling the segment LED drivers 122 and the common LED drivers 124, so the segment LED drivers 122 and the common LED drivers 124 display the video to a user via the display 126.

The SoC 184 receives the feedback signature from the LVDS demultiplexer 182. In the SoC 184, a video scaler 186 scales the stored or transmitted image and/or the feedback or received image, so the two images have the same scale. In some embodiments, the video scaler 186 scales the transmitted image to generate a scaled image, and the memory 139 stores the scaled image. In some embodiments, for example when histograms are used, the video scaler 186 is not used.

The feature generator 158 generates features for both the received or feedback image and the transmitted or stored image. In one embodiment, the feature generator 158 and the feature comparator 160 are implemented by a processor, such as the CPU 106, the DSP 108, or another processor. In another embodiment, for example when histograms are used, the feature generator 158 and the feature comparator 160 are implemented in dedicated hardware as a histogram circuit. In one embodiment, the feature generator 158 generates corner features, or points of interest, for the received image and for the transmitted image. In another embodiment, the feature generator 158 generates histograms for the received image and for the transmitted image.

The feature comparator 160 compares the features generated in the feature generator 158 for the transmitted image and the feedback image. When corner features are used, the feature comparator 160 compares corner features of the transmitted image to corner features of the feedback image. Likewise, when histograms are used, the feature comparator 160 compares the histograms of the transmitted image to histograms of the feedback image. In some embodiments, the corner features or histograms must match exactly to determine a match. In another example, sufficiently similar corner features or histograms indicate a match. For example, a sum of absolute difference may be taken between histograms, and a match is detected when the sum of absolute difference is less than a pre-determined threshold. The feature comparator 160 sends the comparison results to the DSS 110. The feature comparator 160 also sends the comparison results to the DSP 108 and the CPU 106. The DSP 108 and the CPU 106 assist in detecting scenario errors, and improve robustness.

The DSS 110 may halt image transmission when it detects a fault, and continues image transmission when it does not detect a fault. Additionally or alternatively, the DSS 110 transmits an error message to the display circuit 114, indicating the nature or magnitude of the mismatch.

Figure 7:
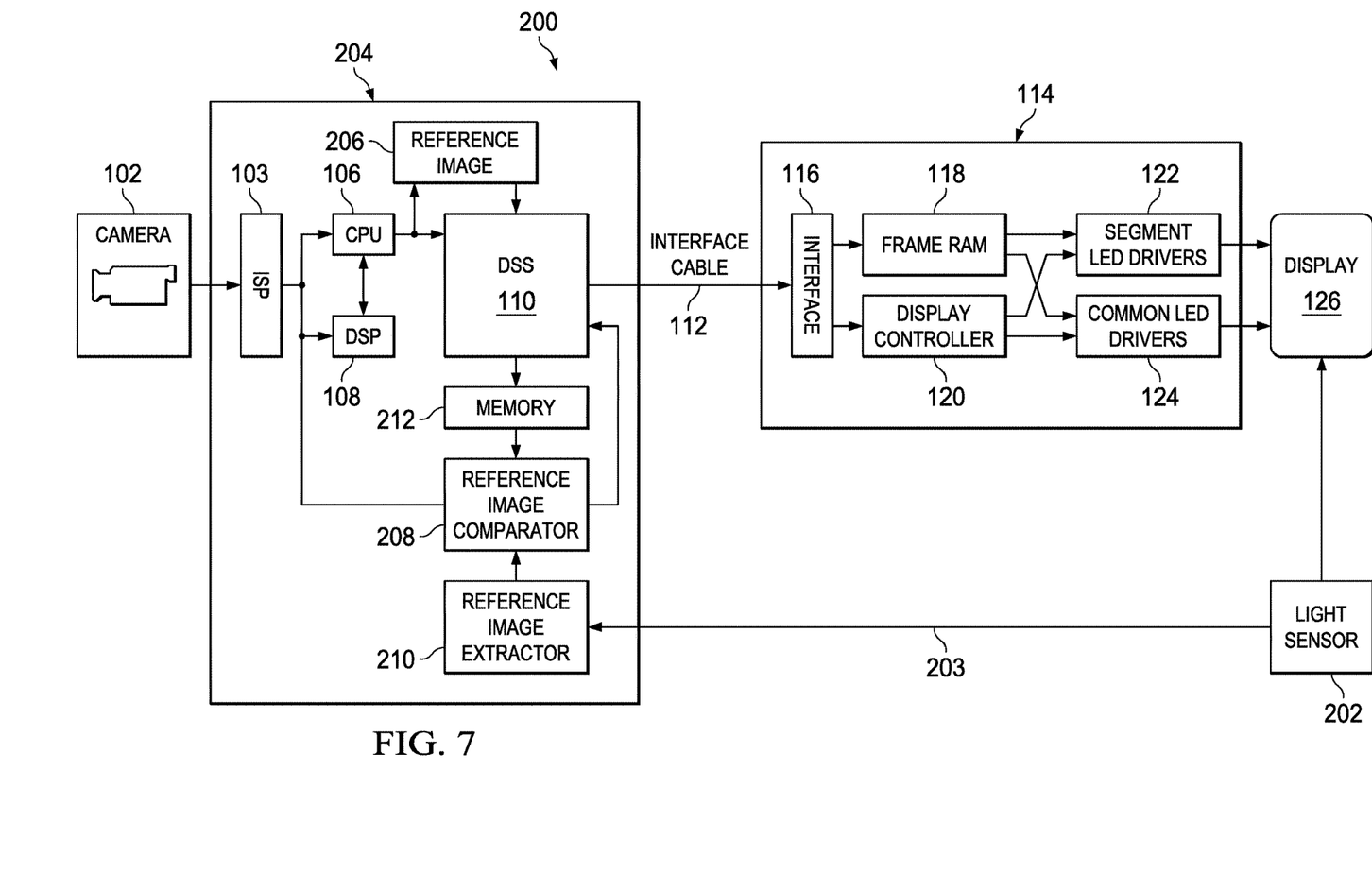
FIG. 7 illustrates another example automotive display validation system.

FIG. 7 illustrates an automotive display validation system 200 for automotive display validation utilizing feedback from a light sensor 202, where only a portion of the image is used for validation. In an embodiment, the automotive display validation system 200 is a low cost system.

An SoC 204 receives an image from the camera 102, which may be mounted on a vehicle. Processors of the SoC 204, such as the ISP 103, the CPU 106, and the DSP 108, process the image. The SoC 204 adds a reference image 206 to the image before transmission, to generate a modified image. In one embodiment, the reference image is added only to a portion of the image that will not be visible to the user, to avoid disrupting the experience of the user. The reference image may be a white patch, a black patch, or a predefined pattern. In other embodiments, the reference image is an entire frame, for example an all-black frame or an all-white frame. The reference image may be an infrared image that is not visible to the user. After the reference image has been added, memory 212 stores the modified image, and the DSS 110 transmits the modified image to the display circuit 114 over the interface cable 112. In some embodiments, additionally, or alternatively, the memory 212 stores the reference image itself. In one embodiment, the original image without the reference image and the reference image are stored separately in the memory 212.

In the display circuit 114, the interface 116 receives the video frames transmitted from the SoC 204 over the interface cable 112. The frame RAM 118 stores the video frames for display to the user. Also, the segment LED drivers 122 and the common LED drivers 124 display the video via the display 126, which may be a LED display.

A light sensor 202 senses the light in all of or a portion of the display 126. In one embodiment, the light sensor 202 senses light in a portion of the image that is not visible to the driver or to the user. In one embodiment, the light sensor 202 is a simple photodetector, such as a photodiode, phototransistor, or light dependent resistor (LDR). In other embodiments, the light sensor 202 is a video camera, for example a low resolution video camera. In additional embodiments, the light sensor is a typical CCD or CMOS video camera. A low cost light sensor may be used. The light sensor 202 transmits the feedback signature 203, which may be based on the light measurement, to the SoC 204, either over the interface cable 112 or over another cable.

The SoC 204 receives the feedback signature from the light sensor 202. The reference image extractor 210 extracts the reference image from the feedback signature received from the light sensor 202. In one embodiment, the reference image extractor 210 subtracts the original video image from the memory 212 from a feedback image, to generate the comparison image.

The SoC 204 also includes a reference image comparator 208, which compares the comparison image extracted in the reference image extractor 210 to the reference image, to the original image, or the modified image stored in the memory 212. The comparison image may be compared to the reference image. In an embodiment, a match is detected when a sum of absolute differences between the comparison image and the reference image is less than a pre-determined threshold. In some embodiments, the reference image comparator 208 only compares certain predefined frames, which contain reference images. When the extracted reference image matches the generated reference image, the system determines that there is no error. On the other hand, when the extracted reference image does not match the generated reference image, the system determines that there is an error. The reference image comparator 208 sends the image comparison to the CPU 106, the DSP 108, and/or the DSS 110.

The DSS 110 may halt image transmission when the system detects an error, and continue image transmission when the system determines that there is no error. Additionally or alternatively, the DSS 110 transmits an error message to the display circuit 114, indicating the nature or magnitude of the mismatch.

Figure 8:
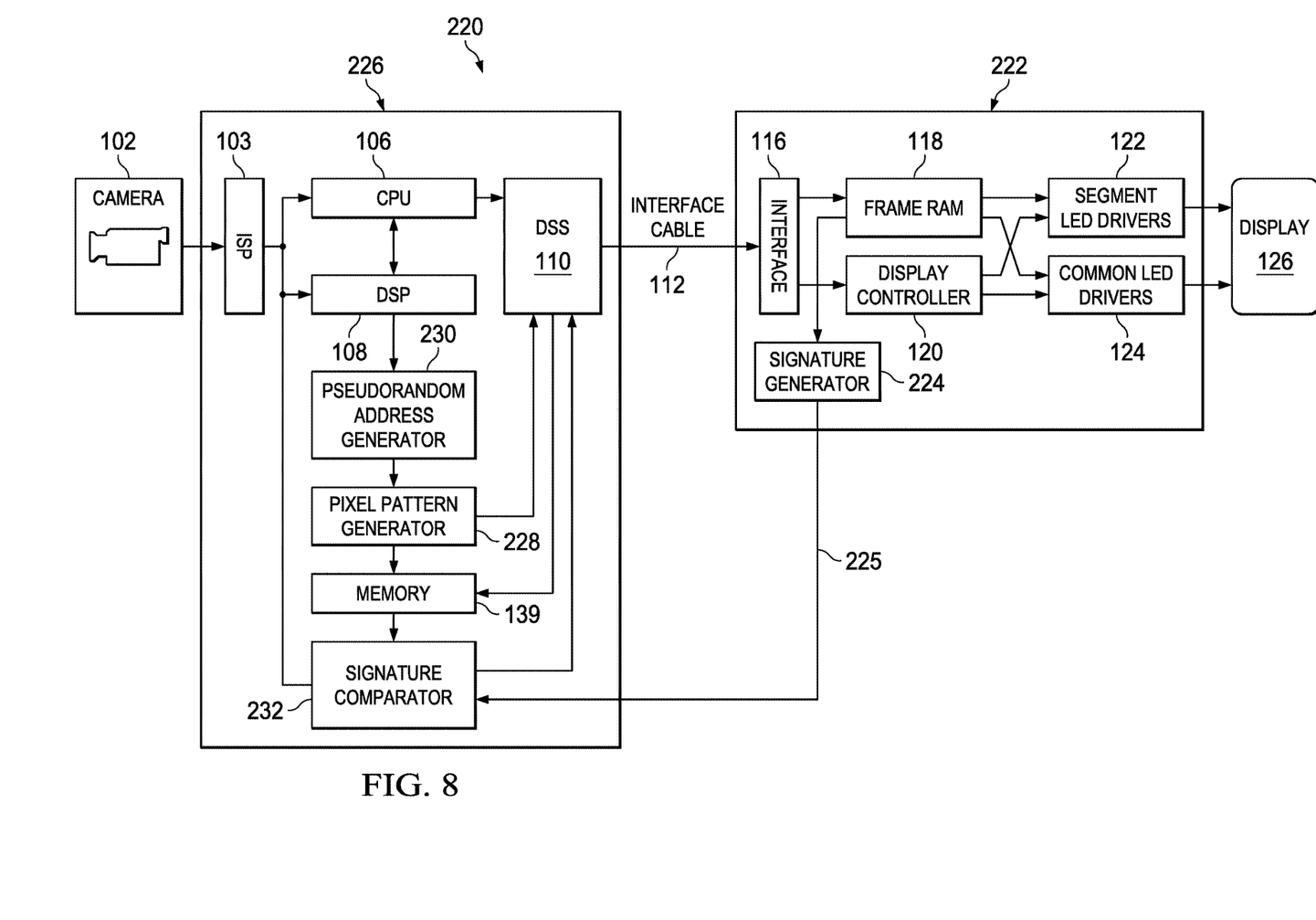
FIG. 8 illustrates an additional example automotive display validation system.

FIG. 8 illustrates an automotive display validation system 220 for a method of automotive display validation based on a portion of the image. The automotive display validation system 220 includes an SoC 226, which transmits an image, captured via the camera 102 and processed by the ISP 103, the CPU 106, and the DSP 108, to the display controller 120, using the DSS 110 to transmit the image over the interface cable 112.

A pseudo-random address generator 230 pseudo-randomly, or semi-randomly, selects one or more regions within the image frame for modification. In one embodiment, the pseudo-random address generator 230 selects a pseudo-random block within the image frame by generating the location of the pseudo-random block. This pseudo-randomly selected block may vary from frame to frame, so that different regions are tested for different frames. In one embodiment, the block locations are changed every frame with an explicit target to test sweep the full display within a given time interval. The location of the pseudo-random block may be added to the image frame, for example as metadata. In another example, the location of the pseudo-random block is maintained separately from the image.

A pixel pattern generator 228 of the SoC 226 generates a predetermined pixel pattern, or a signature, at the location of the image generated by the pseudo-random address generator 230. In an embodiment, a limited number of pixels are adjusted in a predetermined pattern within the block. The predetermined pattern may be designed to be not visible, or to minimally visible, to the user. For example, an infrared pattern may be generated. The pixel pattern generator 228 adds the pre-determined pixel pattern to a video image, to generate a modified image. In an embodiment, the pixel pattern generator 228 adds the location of the pseudo-randomly selected block to the modified image, for example as metadata. The pre-determined pixel pattern adds some noise to the image, without significantly interfering with the user experience. Also, in some embodiments, a clock on the SoC 226 generates a timestamp and adds the timestamp to the modified image, for example as metadata. Memory 139 stores the modified image. In an embodiment, the memory 139 stores the pre-determined pixel pattern. Also, the memory 139 stores the pre-determined pixel pattern separately from the modified image. In one embodiment, both the modified image and the unmodified image are stored in the memory 139. The timestamp for the image may also be stored in the memory 139. In an additional embodiment, the location of the pseudo-random block is stored in the memory 139. Additionally, the pixel pattern generator 228 sends the modified image to the DSS 110 for transmission to a display circuit 222.

The display circuit 222 receives the modified image at the interface 116, from the SoC 226, over the interface cable 112. The modified image may include embedded information indicating the location of the pseudo-random block for this frame, or other information indicated a modified portion of the image. In one embodiment, the display circuit 222 adds a timestamp to the image at the time of arrival using a clock of the display circuit 222. The frame RAM 118 stores the modified image, and the modified image also proceeds to the display controller 120. The modified image in the frame RAM 118 is shown by the display 126 using the segment LED drivers 122 and the common LED drivers 124.

A signature generator 224 extracts the image from the frame RAM 118. The signature generator 224 may extract a portion of the image indicated by the location of the pseudo-random block. Then, the signature generator 224 masks the image at the pseudo-random block. In an embodiment, the feedback signature indicates the pixel values in the pseudo-random block. In another embodiment, the signature generator 224 assigns the entire image to be the feedback signature. In one embodiment, the signature generator 224 also extracts a timestamp for the time of transmission from the image, or assigns a timestamp to the image. In an embodiment, the signature generator 224 is implemented by a processor, for example a CPU. The display circuit 222 then transmits the feedback signature 225 to the SoC 138. In one embodiment, the interface cable 112 is used for transmitting the signature. In another embodiment, a separate cable, for example a low throughput cable, is used for the feedback signature.

The SoC 226 reads the modified image from the memory 139. The SoC 226 may also read out the pixel pattern and/or the pseudo-random block location from the memory 139. In one example, the SoC 226 extracts the pixel pattern from the modified image using the pseudo-random block location. In an embodiment, the SoC 225 reads out a timestamp from the memory 139. A signature comparator 232 receives the feedback signature from the signature generator 224. The signature comparator 232 compares the modified image or the pixel pattern to the feedback signature. In an embodiment, the SoC 226 subtracts the original unmodified image from the feedback signature, leaving a pixel pattern, plus any error or noise introduced by the transmission. Then, this pixel pattern may be compared to the transmission-side pixel pattern. In an embodiment, the SoC 226 directly compares the pixel pattern in the feedback signature to the pre-determined pixel pattern. In other examples, the SoC 226 compares all, or a significant portion of, the feedback signature, which contains the received image, to the modified image. In an embodiment, the SoC 226 compares both the pixel patterns and the timestamps of the images. The time lag for the image transmission and the asynchronous nature of the clock for the SoC 226 and the clock for the display circuit 222 may be taken into account in comparing the transmission timestamp and the feedback timestamp. The signature comparator 232 may subtract a pre-defined time lag from the feedback timestamp to determine a compensated timestamp. Then, the compensated timestamp is compared to the transmission timestamp. In one embodiment, the transmission-side signature and the feedback signature must match exactly to determine a match. In another embodiment, the transmission-side signature and the feedback signature are determined to be a match when they are similar, and to not be a match when they are not similar. For example, a sum of absolute difference may be determined between the transmitted pixel pattern and the pixel pattern, and a match is determined when the sum of absolute difference is below a predetermined threshold. In an embodiment, a match is found when the compensated timestamp is less than a first predetermined threshold of the transmission timestamp and the sum of absolute difference is less than a second predetermined threshold. The signature comparator 232 may send the results to the DSS 110 to control further image transmission. Also, the signature comparator 232 may send the results for the CPU 106 and/or the DSP 108 for analysis.

For example, the DSS 110 may halt image transmission when it detects a fault, and continue image transmission when it does not detect a fault. In one embodiment, additionally or alternatively, the DSS 110 transmits an error message to the display circuit 222, indicating the nature or magnitude of the mismatch. In one embodiment, the pseudo-random address generator 230, the pixel pattern generator 228, and the signature comparator 232 are implemented on a separate processor, or on the DSP 108 or on the CPU 106. In other embodiments, they are implemented in specialized hardware.

Figure 9:
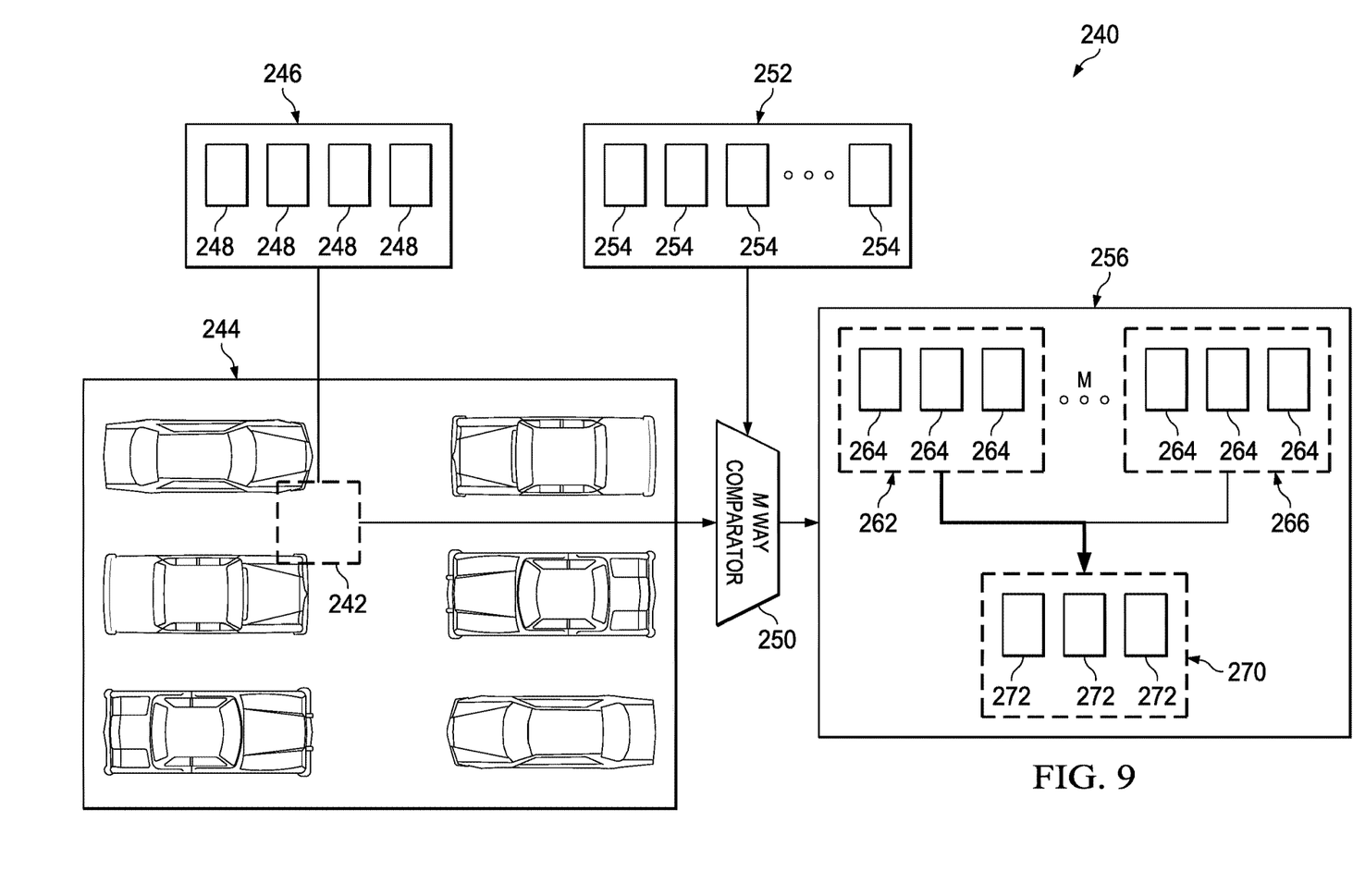
FIG. 9 illustrates an example histogram generation circuit.

Histogram features used as a signature are resistant to minor noise. However, computing a histogram is complex and time consuming, and a CPU may be poorly suited for computing a histogram. In an embodiment, a hardware circuit generates histograms on-the-fly. FIG. 9 illustrates a histogram generation circuit 240, a digital circuit for computing histograms. In an embodiment, the histogram generation circuit 240 implements all or part of the signature generator 132 and the feature generator 176. The histogram generation circuit 240 may be used for other applications involving histogram computation. The histogram generation circuit 240 includes a register block 246, a register block 252, an M way comparator 250, and a histogram merging circuit 256. The histogram generation circuit 240 receives an image 244 for histogram computation. The histogram generation circuit 240 updates multiple histograms for a block of pixels in parallel, with one histogram per pixel. Then, the histogram generation circuit 240 combines the multiple parallel histograms, to generate one histogram for the block.

The register block 246 contains configuration registers 248, which store ranges for the blocks of the image 244 for histogram generation. In an example, the configuration registers 248 contain the minimum x value, the maximum x value, the minimum y value, and the maximum y value, for a block range, for example for block 242 of the image 244. The configuration registers 248 output the values for the block 242 to the M way comparator 250.

The register block 252 contains configuration registers 254, B−1 bin thresholds. B, which is configurable, indicates the number of bins for the histogram. The histogram merging circuit 256 contains histograms 262 to 266 and a master histogram 270. The M way comparator 250 receives the block 242 containing a block of M pixels, and the B−1 bin thresholds from the configuration register 254. The M way comparator compares each of the M pixels in parallel to the B−1 bin thresholds. The M way comparator 250 produces M histograms, one histogram for each of M pixels of the image, generating histograms 262 to 266 in the histogram merging circuit 256. Each of histograms 262 to 266 contains registers 264, one register for each of B bins, where the bins of each histogram indicate the histogram values for one pixel of the M pixels. In an embodiment, each of histograms 262 to 266 has one bin with a value of 1, indicating the bin to which the corresponding pixel belongs, and the remaining bins have a value of 0. The histogram merging circuit 256 generates the master histogram 270, with the bins 272, N bins, by adding the bins of the histograms 262 to 266 together. The histogram merging circuit 256 sums the M histograms 262 to 266 to generate the master histogram 270. M is an integer, for example 64, 256, or 1024. The value of N, for the bins 272, is configurable. The value of N may be configured by the register block 252 to generate a 10-way histogram for one frame, and a 64-way histogram for the next frame. This flexibility enables the histogram generation circuit 240 to be immune to the effects of computational complexity. The histogram generation circuit 240 is able to compute sophisticated histograms with the same computational cost as straightforward histograms. Also, the histogram updating occurs in parallel for M pixels, because of the M way comparator 250. The histogram data structure may be updated in parallel for M pixels, so the time for total histogram is 1/M.

Figure 10:
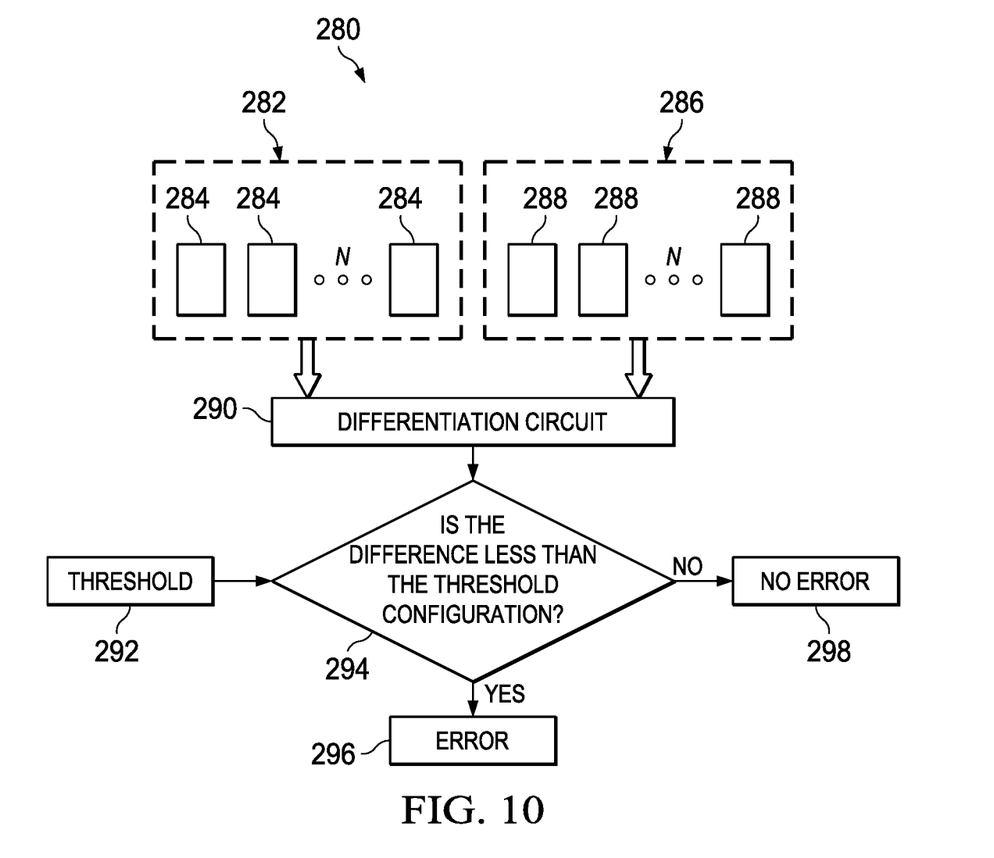
FIG. 10 illustrates an example histogram comparison circuit.

FIG. 10 illustrates a histogram comparison circuit 280 for computing and comparing histograms for multiple images. The histogram comparison circuit 280 receives a histogram 282, for example for the output of the DSS. The histogram 282 contains bins 284, which are B bins. In one embodiment, a histogram generation circuit, such as the histogram generation circuit 240, generates the histogram 282. The histogram comparison circuit 280 also receives a histogram 286, for another image, for example for a feedback image for automotive display validation. The histogram 286 contains bins 288, which is also B bins. In one embodiment, a histogram generation circuit, such as the histogram generation circuit 240, generates the histogram 286. In an example, the same histogram generation circuit generates the histogram 282 and the histogram 286. In another example, separate histogram generation circuits generate the histogram 282 and the histogram 286.

The histogram 282 and the histogram 286 are fed to a differentiation circuit 290, for example a sum of absolute difference circuit. The differentiation circuit 290 compares the histogram 282 and the histogram 286, to determine the sum of absolute difference between the histogram 282 and the histogram 286, which indicates noise, for example from image transmission. The differentiation circuit 290 computes the sum of absolute difference between the histogram 282 and the histogram 286 by taking the absolute value of the difference between the values of the bins of the histograms and summing these absolute value differences. When the sum of absolute difference is large, this may indicate a significant degradation in the quality of the transmitted image.

A block 294 determines whether the sum of absolute difference from differential circuit 290 is less than a threshold 292. The threshold 292 may be a configurable threshold, which enables the configuration of a variable threshold, which is used to differentiate an acceptable level of noise from a level of noise that indicates a transmission problem or a loss of accuracy. When the difference is less than the threshold 292, the histogram comparison circuit 280 proceeds to block 296, and determines that there is no error. On the other hand, when the difference is greater than or equal to the threshold 292, the histogram comparison circuit 280 proceeds to block 298, and determines that there is an error.

Although example embodiments have been described in detail, it should be understood that various changes, substitutions and alterations can be made thereto without departing from the spirit and scope of the invention as defined by the appended claims.

What is claimed is:

1. A method comprising:
receiving, by a system-on-a-chip (SoC) from a camera mounted on a vehicle, a first frame of a first image, wherein the SoC includes a first signature generator and a signature comparator;
generating, by the first signature generator, a first signature using the first frame;
transmitting, by the SoC to a display circuit over an interface cable, the first frame, wherein the display circuit includes a second signature generator, and wherein the display circuit is physically separate from the SoC;
receiving, by the display circuit, a received first frame;
generating, by the second signature generator, a second signature using the received first frame;
transmitting, by the display circuit, the second signature to the SoC;
receiving, by the SoC from the display circuit, the second signature;
determining, by the SoC, a comparison using the signature comparator;
detecting, by the SoC, an error based on the comparison of the first signature not matching the second signature; and
transmitting, by the SoC to the display circuit, a second frame of the first image, in response to the comparison determining that the first signature matches the second signature.

2. The method of claim 1, wherein the first signature and the second signature are a cyclic redundancy check (CRC) value, a frame difference signature, or a secure hash algorithm (SHA) value.

3. The method of claim 1, wherein the first signature is a first timestamp generated based on a first clock of the SoC, and wherein the second signature is a second timestamp generated base on a second clock of the display circuit.

4. The method of claim 1, wherein the second signature is based on a third frame, and wherein the comparison determines whether the first frame matches the third frame.

5. The method of claim 4, further comprising:
selecting a pseudo-random block of the first frame; and
applying a pixel pattern to the pseudo-random block of the first frame, before transmitting the first frame; and
wherein determining the comparison is based on whether the pseudo-random block of the first frame matches the pseudo-random block of the third frame.

6. The method of claim 4, wherein determining whether the first frame matches the third frame comprises:
computing a first histogram of the first frame;
computing a second histogram of the third frame; and
determining whether the first histogram of the first frame matches the second histogram of the third frame.

7. The method of claim 6, wherein computing the first histogram is performed by a histogram generator circuit of the SoC, and wherein determining whether the first histogram of the first frame matches the second histogram of the third frame is performed by a histogram comparison circuit of the SoC.

8. The method of claim 4, wherein determining whether the first frame matches the third frame comprises:
   determining a first corner feature of the first frame;
   determining a second corner feature of the third frame; and
   determining whether the first corner feature of the first frame matches the second corner feature of the third frame.

9. The method of claim 4, further comprising:
   scaling the first frame to match a scale of the third frame, before determining whether the first frame matches the third frame.

10. The method of claim 1, further comprising:
    receiving, by an interface of the display circuit, the first frame;
    storing, by a frame random access memory (RAM) of the display circuit, the first frame, as a stored image;
    displaying, on a display, the stored image; and
    capturing, by a monitoring camera, a view of the display, wherein the second signature is the view of the display.

11. The method of claim 1, further comprising:
    receiving, by an interface of the display circuit, the first frame;
    storing, by a frame random access memory (RAM) of the display circuit, the first frame, as a stored image;
    displaying, on a display, the stored image, as a displayed image; and
    detecting, by a light sensor, an intensity of a portion of the displayed image, wherein the second signature is a detected light intensity.

12. The method of claim 1, wherein the interface cable is a low voltage differential signaling (LVDS) cable, wherein the method further comprises:
    extracting, by an LVDS demultiplexer, an extracted image from the LVDS cable; and
    transmitting, by the LVDS demultiplexer to the SoC, the extracted image, wherein the second signature is the extracted image.

13. A circuit comprising:
    an image signal processor configured to:
       receive a first signal from a camera; and
       produce a first image in response to the first signal from the camera;
    a display subsystem coupled to the image signal processor and configured to provide the first image to a display circuit, wherein the display circuit is configured to generate a feedback signature using a received first image, and wherein the display circuit is physically separate from the circuit;
    a processor coupled to the image signal processor and configured to generate a transmission-side signature using the first image; and
    a signature comparator coupled to the processor and configured to:
       receive, from the display circuit, the feedback signature;
       determine whether the feedback signature matches the transmission-side signature;
       when the feedback signature does not match the transmission-side signature, detect an error in transmission of the first image; and
       when the feedback signature matches the transmission-side signature, cause the circuit to transmit, to the display circuit, a second image that is subsequent to the first image.

14. The circuit of claim 13, wherein each of the transmission-side signature and the feedback signature includes at least one value from a group consisting of: a cyclic redundancy check value, a frame difference value, and a secure hash algorithm value.

15. The circuit of claim 13, wherein the determination of whether the feedback signature matches the transmission-side signature includes determining whether a difference between the feedback signature and the transmission-side signature is greater than a threshold.

16. The circuit of claim 13, wherein:
    the feedback signature includes a third image based on the first image; and
    the determination of whether the feedback signature matches the transmission-side signature includes determining a difference between the first image and the third image.

17. A display system comprising:
    a display circuit, the display circuit including:
       an interface configured to receive, over an interface cable, a transmission of a video image from a display subsystem as an image;
       a display controller configured to display the image on a display device; and
       a feedback signature generator configured to:
          generate a feedback signature using the image; and
          transmit the feedback signature; and
    a system-on-a-chip (SoC) physically separate from the display circuit, the SoC including:
       a processor configured to receive a plurality of video frames from a camera;
       the display subsystem configured to process the plurality of video frames into the video image and to transmit the video image over the interface cable to the display circuit;
       a transmission signature generator configured to generate a transmission signature using the video image prior to the video image being transmitted to the display circuit; and
       a signature comparator configured to receive the feedback signature and the transmission signature, wherein the signature comparator is configured to determine whether the feedback signature matches the transmission signature.

18. The display system of claim 17 further comprising:
    a frame random access memory (RAM) coupled to the interface, the frame RAM configured to store the image; and
    light emitting diode (LED) drivers coupled to the frame RAM, the LED drivers configured to display the image on the display device.

19. The display system of claim 17, wherein:
    the feedback signature matches the transmission signature when a difference between the transmission signature and the feedback signature is less than a predefined threshold.

* * * * *